(12) United States Patent
Brower

(10) Patent No.: US 12,413,441 B2
(45) Date of Patent: Sep. 9, 2025

(54) BLOCKCHAIN-BASED IoT

(71) Applicant: Hubbell Incorporated, Shelton, CT (US)

(72) Inventor: John E. Brower, Fairfield, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/620,042

(22) Filed: Mar. 28, 2024

(65) Prior Publication Data
US 2024/0340194 A1     Oct. 10, 2024

Related U.S. Application Data

(60) Provisional application No. 63/457,560, filed on Apr. 6, 2023.

(51) Int. Cl.
| | |
|---|---|
| *H04L 12/28* | (2006.01) |
| *H04L 67/10* | (2022.01) |
| *H04L 67/306* | (2022.01) |

(52) U.S. Cl.
CPC .......... *H04L 12/2807* (2013.01); *H04L 67/10* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 9,479,567 B1* | 10/2016 | Koorapati | G06F 16/178 |
| 2015/0222656 A1* | 8/2015 | Haugsnes | H04L 63/104 |
| | | | 726/23 |
| 2016/0255139 A1* | 9/2016 | Rathod | H04L 51/046 |
| | | | 709/203 |
| 2021/0304155 A1 | 9/2021 | Blackburn et al. | |

(Continued)

OTHER PUBLICATIONS

Zikratov et al., "Ensuring data integrity using blockchain technology", Oct. 18, 2017, IEEE, 2017 20th Conference of Open Innovations Association (FRUCT) (2017, pp. 534-539) (Year: 2017).*

(Continued)

*Primary Examiner* — Davoud A Zand
(74) *Attorney, Agent, or Firm* — Michael Best & Friedrich LLP

(57) ABSTRACT

A method for user control of one or more devices located within a physical space. The method includes creating a network block in response to a user input, the network block including network identifying metadata. The network identifying metadata includes a list of the one or more devices. The method also includes writing the network block to a ledger under a first user profile, linking the network block to a host server, receiving a first request to modify the network block, and modifying the network block. Modifying the network block includes adding network identifying metadata, deleting network identifying metadata, and altering network identifying metadata. The method also includes receiving a second request to transfer ownership of the network block and linking the network block to a second (Continued)

user profile. Linking the network block to the second user profile transfers ownership of the list of the one or more devices.

20 Claims, 8 Drawing Sheets

(56) References Cited

U.S. PATENT DOCUMENTS

2022/0247624 A1   8/2022   Johnson et al.

OTHER PUBLICATIONS

PCT/US2024/021953 International Search Report and Written Opinion dated Jul. 10, 2024 (14 pages).
Dorri et al., "Blockchain for IoT Security and Privacy: The Case Study of a Smart Home," Jan. 12, 2017 [online], [retrieved May 28, 2024]. Retrieved from the Internet <URL: https://ieeexplore.ieee.org/abstract/document/7917634>.

* cited by examiner

BLOCKCHAIN-BASED IoT

RELATED APPLICATIONS

The present application claims priority to provisional patent application No. 63/457,560, which was filed on Apr. 6, 2023, the entire contents of which are hereby incorporated by reference.

FIELD

The embodiments disclosed herein relate to methods for user control of one or more devices located within a physical space.

SUMMARY

Modern living and working spaces may include one or more smart devices (e.g., fans, lighting receptacles, television, thermostats, etc.) and control the one or more devices via a network. Smart devices may be remotely controlled by an external device (e.g., a smartphone, tablet, etc.) in electronic communication with the network. Smart devices may also be configured to operate based on established user control settings for a specific living or working space. Wherein users may be owners, occupants, and/or tenants of the specific living or working space. Oftentimes, user control of living or working spaces changes, with the established user control settings remaining in effect after the change in user control of the living or working space occurs. New users may wish to modify or transfer the smart devices of the living or working space without reconfiguring every smart device on the network. In some instances, it may be difficult and time-consuming for new users to re-configure the specifications or settings for every smart device. Methods disclosed herein may allow for faster transfer of control of the smart devices from the established user to the new user. For example, control of one or more smart devices within the specific living or working space is transferred to the new user. The new user may access the smart devices without the need to reconfigure each and every smart device to the network with new user control settings.

The disclosure provides, in one aspect, a method for user control of one or more devices located within a physical space. The method includes creating a network block in response to a user input, the network block including network identifying metadata, and the network identifying metadata includes a list of the one or more devices located within the physical space. The method also includes writing the network block to a ledger under a first user profile, linking the network block to a host server, receiving a first request to modify the network block, and modifying the network block in response to receiving the first request. Modifying the network block includes at least one selected from the group consisting of adding network identifying metadata to the network block, deleting network identifying metadata from the network block, and altering the network identifying metadata within the network block. The method also includes receiving a second request to transfer ownership of the network block and linking the network block to a second user profile in response to receiving the second request. Linking the network block to the second user profile transfers ownership of the list of the one or more devices located within the physical space to the second user profile.

In some aspects, the list of the one or more devices includes at least one selected from the group consisting of a first set of devices, a second set of devices, and a third set of devices, the first set of devices being different than the second set of devices and the third set of devices, and the second set of devices being different than the third set of devices.

In some aspects, the first set of devices includes first identifying metadata, the second set of devices includes second identifying metadata, and the third set of devices includes third identifying metadata.

In some aspects, linking the network block to the second user profile transfers ownership of the first set of devices, the second set of devices, and the third set of devices to the second user profile.

In some aspects, writing the network block to the ledger includes storing the network block in a blockchain.

In some aspects, the list of the one or more devices includes smart home devices.

In some aspects, the method includes receiving a third request to create the first user profile, creating the first user profile based on the third request, receiving a fourth request to create the second user profile, and creating the second user profile based on the fourth request. The third request is created by a different user than the fourth request.

The disclosure provides, in another aspect, a method for modifying user control of one or more devices located within a physical space. The method includes creating a network block in response to a user input, the network block including network identifying metadata, and the network identifying metadata includes a list of the one or more devices located within the physical space. The method also includes writing the network block to a ledger under a first user profile, linking the network block to a host server, receiving a request to modify the network block, and modifying the network block in response to receiving the request to modify the network block.

In some aspects, the list of the one or more devices includes at least one selected from the group consisting of a first set of devices, a second set of devices, and a third set of devices, the first set of devices being different than the second set of devices and the third set of devices, and the second set of devices being different than the third set of devices.

In some aspects, the first set of devices includes first identifying metadata, the second set of devices includes second identifying metadata, and the third set of devices includes third identifying metadata.

In some aspects, modifying the network block includes adding network identifying metadata to the network block based on receiving the request to modify the network block.

In some aspects, modifying the network block includes deleting network identifying metadata from the network block based on receiving the request to modify the network block.

In some aspects, modifying the network block includes altering the network identifying metadata within the network block based on receiving the request to modify the network block.

The disclosure provides, in another aspect, a method for tracking user control of one or more devices located within a physical space. The method includes creating a network block in response to a user input, the network block including network identifying metadata, and the network identifying metadata includes a list of the one or more devices located within the physical space. The method also includes writing the network block to a ledger under a first user profile, linking the network block to a host server, receiving a first request to transfer ownership of the network block, and linking the network block to a second user profile in response to receiving the first request to transfer ownership.

In some aspects, the list of the one or more devices includes at least one selected from the group consisting of a first set of devices, a second set of devices, and a third set of devices, the first set of devices being different than the second set of devices and the third set of devices, and the second set of devices being different than the third set of devices.

In some aspects, the first set of devices includes first identifying metadata, the second set of devices includes second identifying metadata, and the third set of devices includes third identifying metadata.

In some aspects, linking the network block to the second user profile transfers ownership of the first set of devices, the second set of devices, and the third set of devices to the second user profile.

In some aspects, the method includes storing the network block in a blockchain.

In some aspects, the list of the one or more devices includes the devices of the physical space.

In some aspects, the method includes receiving a second request to create the first user profile, creating the first user profile based on the second request, receiving a third request to create the second user profile, and creating the second user profile based on the third request. The second request is created by a different user than the third request.

Other aspects of the technology will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. For ease of description, some or all of the example systems presented herein are illustrated with a single exemplar of each of its component parts. Some examples may not describe or illustrate all components of the systems. Other exemplary embodiments may include more or fewer of each of the illustrated components, may combine some components, or may include additional or alternative components. The application is capable of other embodiments and of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more electronic processors, one or more computer-readable medium modules, one or more input/output interfaces, and various connections (e.g., a system bus) connecting the components.

Methods described herein may be performed by one processor or a collection of processors located locally on a single device, or distributed among various local and remote locations (for example, in separate devices, located in the cloud, etc.). Additionally, all or some of the steps presented in each method may be used. In some embodiments, the steps are conducted in a different order.

Figure 1:
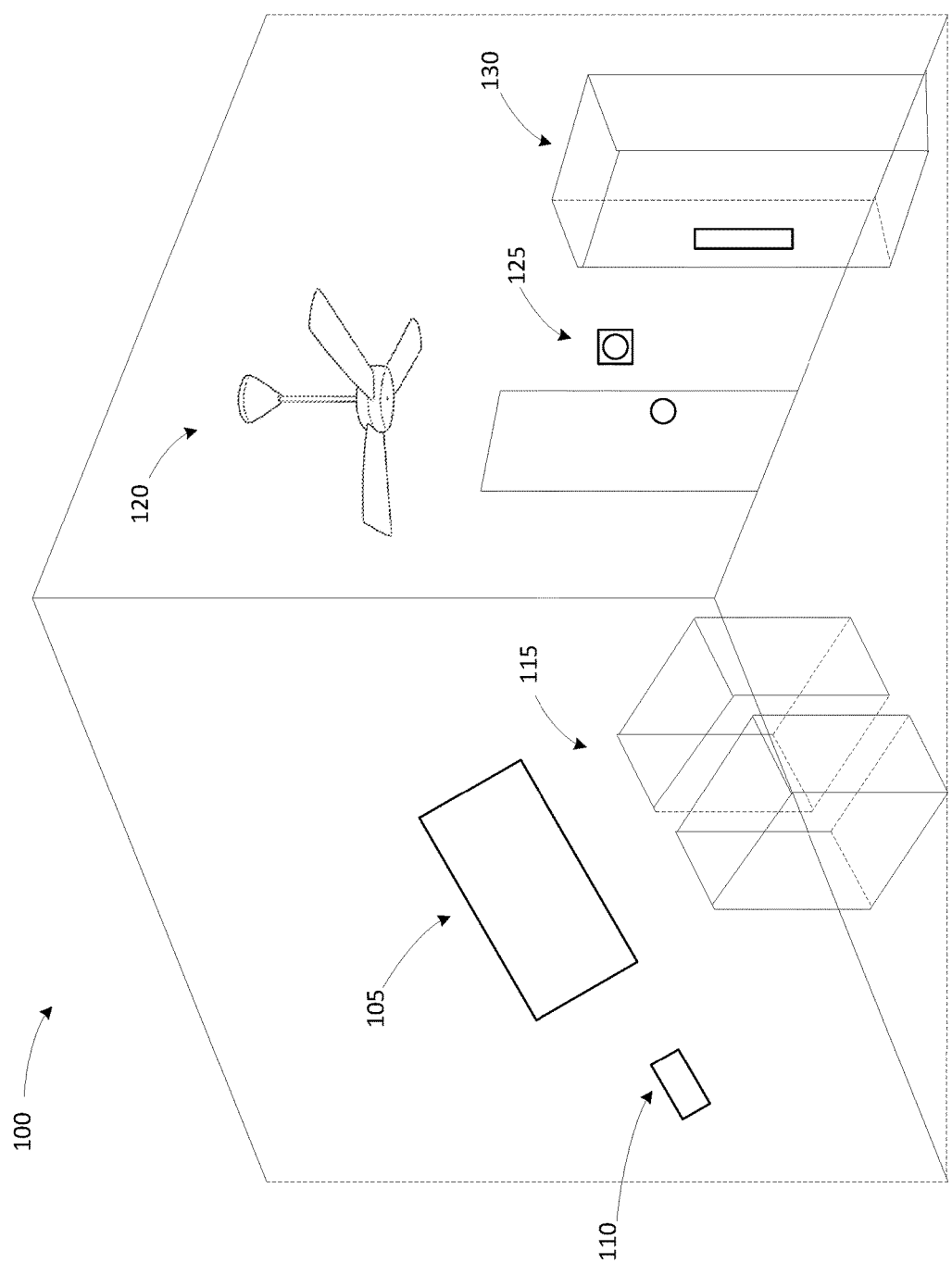
FIG. 1 illustrates a physical space including one or more devices, in accordance with an embodiment of the disclosure.

FIG. 1 illustrates a physical space 100 including one or more devices, according to some embodiments. For example, the physical space 100 can be any enclosed living area or working area capable of supporting human inhabitants. In the illustrated embodiment, the physical space 100 is a smart home with the one or more devices being home appliances. The one or more devices may be electrically connected to and/or electronically communicating with a wireless network of the physical space 100. In some embodiments, the one or more devices may be controlled remotely via the wireless network in response to one or more inputs from an external device.

As shown in FIG. 1, the one or more devices within the physical space 100 may include a first set of devices 105 (e.g., one or more smart TVs), a second set of devices 110 (e.g., one or more smart thermostats), a third set of devices 115 (e.g., a smart washer and/or dryer), a fourth set of devices 120 (e.g., a smart ceiling fan), a fifth set of devices 125 (e.g., a smart doorbell such as, but not limited to, doorbells with video and audio transmission capabilities), and a sixth set of devices (e.g., a smart fridge). It should be understood that the physical space 100 may include a greater or fewer number of sets of devices than shown. For example, the one or more devices may also include smart devices such as, but not limited to, water heaters, light receptacles, lighting fixtures, light bulbs, alarm/security systems, garage doors, audio equipment, dishwashers, automatic vacuums, etc. Although described above as a smart home, in some embodiments, the physical space 100 may be other living areas having different human inhabitants or owners over a period of time such as an apartment, a condo, a timeshare, etc. Although described as owner(s) below, transfers may occur between tenants, occupants, users, and/or the like.

In other embodiments, the physical space 100 is a larger, enclosed working area such as a hospital, an office building, a construction site, a grocery store, a warehouse, etc. In such embodiments, the one or more devices may include smart devices such as computers, industrial lighting fixtures, air conditioning systems, medical equipment, manufacturing equipment, etc. Additionally, when the one or more devices within the physical space 100 are configured to communicate with the wireless network, the one or more devices may be configured to certain specifications or settings based on a current user (e.g., an owner or tenant) of the physical space 100. When ownership/occupancy of the physical space 100 is transferred to a new user (e.g., a new owner or new tenant), it may be difficult and time-consuming to re-configure the specifications or settings for each one of the one or more devices.

Figure 2:
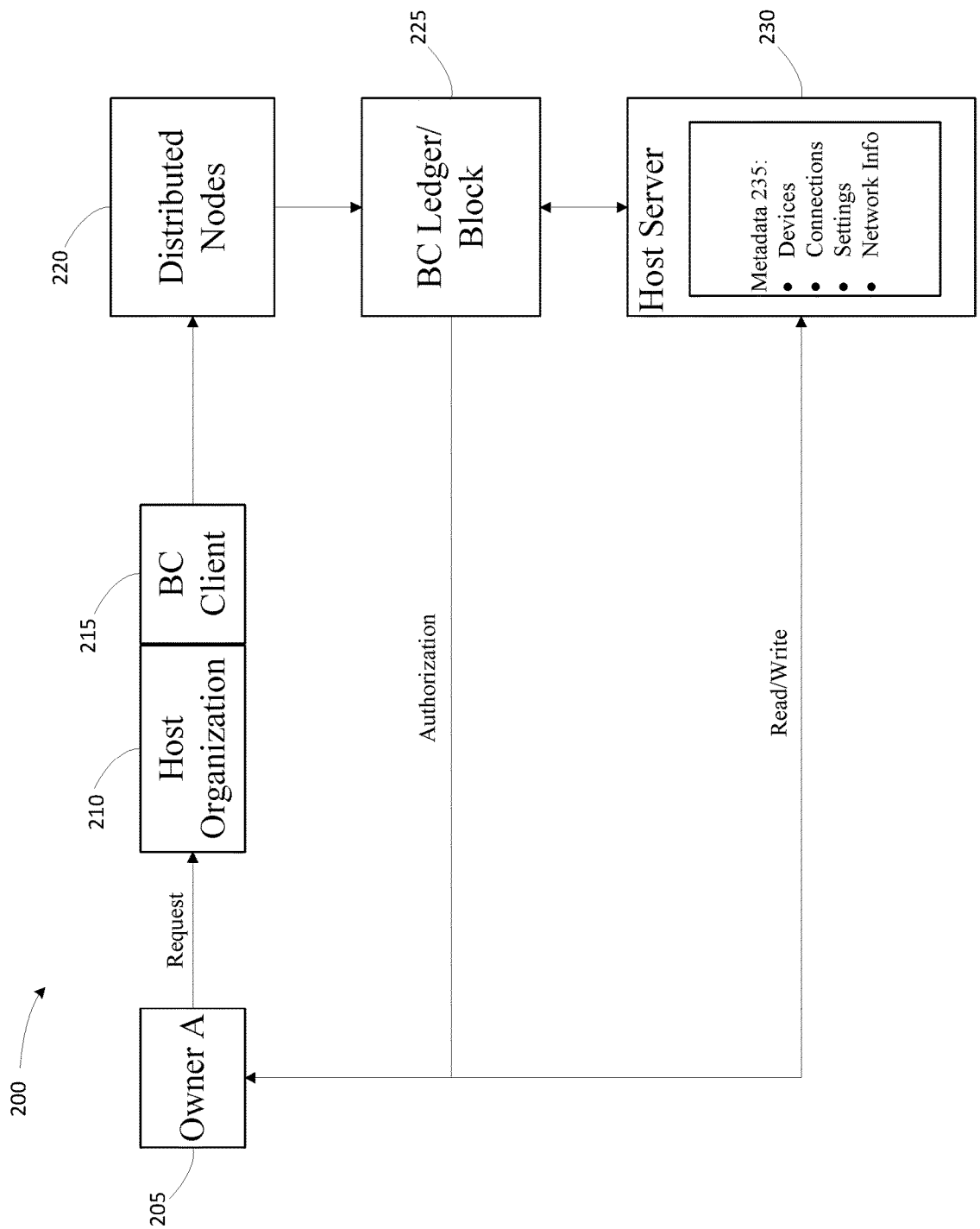
FIG. 2 illustrates a system for user control of the one or more devices of FIG. 1, in accordance with an embodiment of the disclosure.

FIG. 2 illustrates a network system 200 for user control of the one or more devices within the physical space 100, according to some embodiments. The embodiment shown in FIG. 2 may also be considered a blockchain ecosystem. In the illustrated embodiment, the network system 200 includes a first owner 205 (e.g., the current owner/user/tenant/occupant of the physical space 100), a host organization 210, a client 215, a plurality of distributed nodes 220, a ledger 225 (e.g., a blockchain ledger), and a host server 230, which itself includes storage for network identifying metadata 235. In some embodiments, the first owner 205 accesses the host organization 210 and the client 215 via a web application and/or a mobile application. In some embodiments, the web application and the mobile application are combined into a single application that performs the functions of both, as illustrated in FIG. 2 with the combination of the host organization 210 and the client 215. The web application and the mobile application may be accessed using personal devices for example, but not limited to, a mobile device, a personal tablet, a personal computer, a company or organization computer, or the like. For example, the personal device may include an electronic processor (for example, a microprocessor, an electronic controller, a microcontroller, or another suitable programmable device), a memory, a first communication interface, and an input/output device.

The memory may be a non-transitory computer readable medium. The memory can include combinations of different types of memory, for example a ROM, a RAM (for example, DRAM, SDRAM, etc.), EEPROM, flash memory, a hard disk, an SD card, or other suitable magnetic, optical, physical, or electronic memory devices. The electronic processor is connected to the memory and executes software instructions that are capable of being stored in RAM of the memory (for example, during execution), ROM of the memory (for example, on a generally permanent basis), or another non-transitory computer readable medium for example another memory or a disc. The electronic processor is configured to execute, among other things, instructions related to operations and methods described herein.

The host organization 210 may be a third-party agency, company, and/or organization that provides the implementation of the client 215 via the web application or the mobile application. In some embodiments, the client 215 is a blockchain client. The client 215 may be software stored within the web application and/or the mobile application (or, for example, within the memory of the personal device or the memory of a remote server) that accesses and processes transactions. In some embodiments, the host organization 210 and the client 215 receive a user input (e.g., a request) from the first owner 205 indicative of creating a network block. The network block may be a virtualization of the one or more devices within the physical space 100 with a permanent link to the network identifying metadata 235. In response to receiving the user input to create the network block, the client 215 may create the network block including the network identifying metadata 235 by communicating with the plurality of distributed nodes 220. The plurality of distributed nodes 220 may be a collection of electronic processors within the network system 200 that implement the client 215. For example, the plurality of distributed nodes 220 is a public blockchain in which each electronic processor of the collection of electronic processors is independently owned. In some examples, the plurality of distributed nodes 220 validates the network block at each node of the plurality of nodes 220. When validating the network block, each node of the plurality of nodes 220 stores a copy of the network block for future validations. For example, the plurality of distributed nodes 220 stores the network block, including the network identifying metadata 235 in a shared, distributed digital ledger.

In some embodiments, the plurality of distributed nodes 220 are in electronic communication with a centralized, digital storage of a plurality of network blocks. In the illustrated embodiment, the plurality of distributed nodes 220 are in electronic communication with the ledger 225. For example, the plurality of distributed nodes 220 post their stored transactions (e.g., creation of network blocks) to the ledger 225 for storage. In some embodiments, once the network block is stored in the ledger 225, the ledger 225 encrypts the network block such that only the first owner 205 is able to view the network identifying metadata 235. The ledger 225 may provide authorization to the first owner 225 to modify the network block, as described below. Additionally, the ledger 225 securely verifies the creation of the network block within the network system 200.

In some embodiments, the ledger 225 is in electronic communication with the host server 230. In some embodiments, the host server 230 facilitates interactions between the first owner 205 and the network block (including the network identifying metadata 235) via the client 215. For example, the host server 230 stores an encrypted copy of the network block. By accessing the client 215 via the web application or the mobile application, the first owner 205 may modify the network block. In some embodiments, each device of the one or more devices includes the network identifying metadata 235. For example, the network identifying metadata 235 includes information associated with a list of the one or more devices within the network block, electrical connections of the one or more devices, settings or configurations of the one or more devices, and network system 200.

Figure 3:
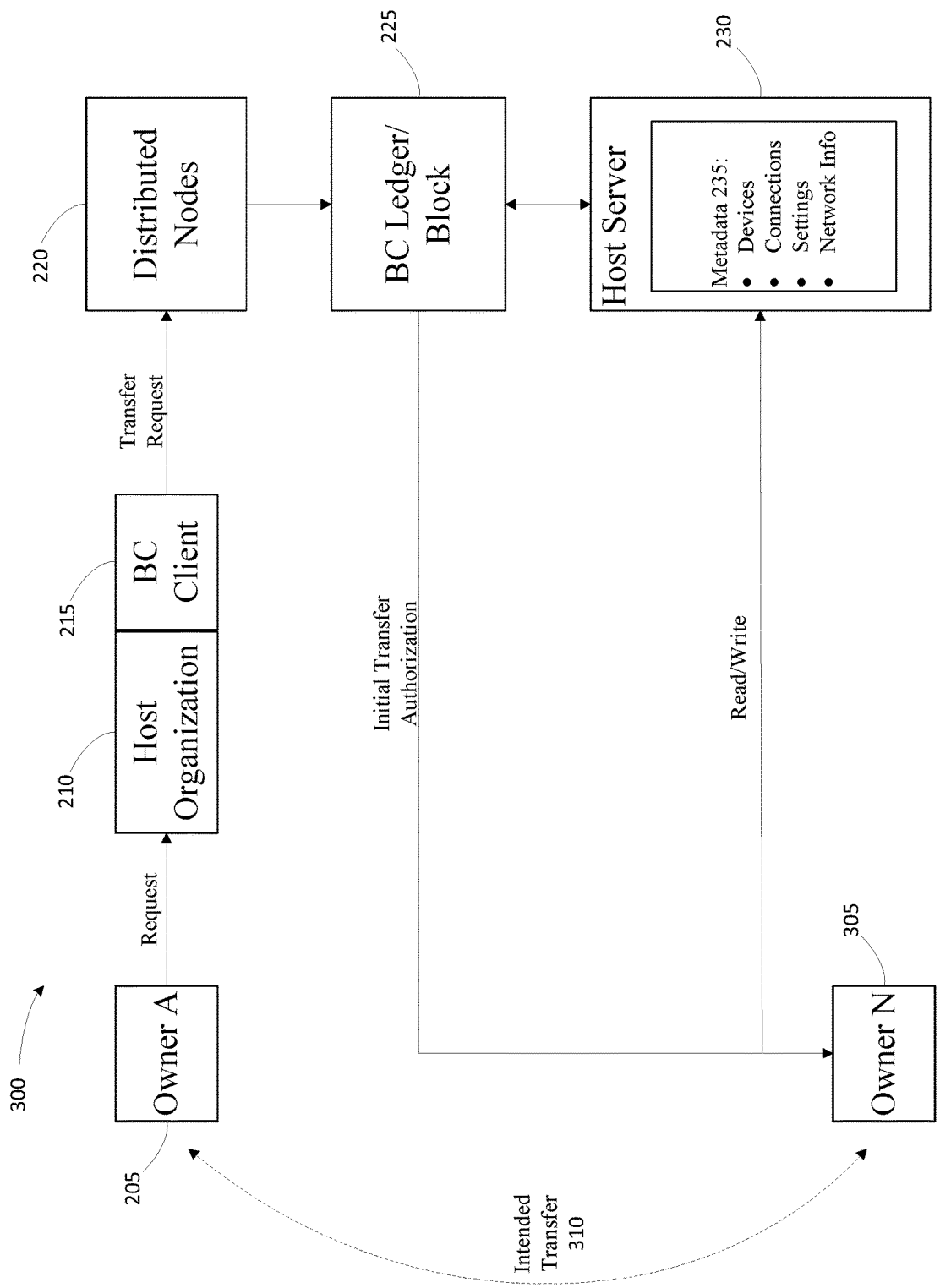
FIG. 3 illustrates a system for tracking user control of the one or more devices of FIG. 1, in accordance with an embodiment of the disclosure.

FIG. 3 illustrates a network system 300 for tracking user control of the one or more devices within the physical space 100, according to some embodiments. In the illustrated embodiment, the network system 300 may include similar components to the components of the network system 200, as described above with reference to FIG. 2. In some embodiments, the network system 300 includes a second owner (user/tenant/occupant) 305. For example, the second owner 305 is a subsequent owner/user/tenant/occupant of the physical space 100 after the first owner 205. The first owner 205 may transfer user control of the one or more devices of the physical space 100 to the second owner 305. For example, the first owner 205 provides a user input (e.g., a transfer request) to the client 215 indicative of an intended transfer 310 of user control of the one or more devices to the second owner 305. In some embodiments, the transfer request is provided via the web application and/or the mobile application. In other embodiments, the transfer request may be, or may be a result of, an electronic transfer of assets such as, but not limited to, a bank transfer, a bank transaction, a loan transfer, or the like for the physical space 100. In some embodiments, when the physical space 100 transfers user control frequently (such as an apartment, a condo, a hospital room, etc.) for example, the transfer request may be provided to the second owner 305 via electronic mail from the web application or the mobile application. Upon receipt of the transfer request, the client 215 may process the transfer request as a transaction of user control of the network block from the first owner 205 to the second owner 210. The client 215 may provide the transaction of user control to the plurality of distributed nodes 220. The plurality of distributed nodes 220 may validate the transaction of the network block and store a copy of the network block with the second owner 305 having user control of the one or more devices. In some embodiments, the plurality of distributed nodes 220 post their stored transactions (e.g., the intended transfer 310 of the network block) to the ledger 225 for storage. In some embodiments, once the network block is stored in the ledger 225, the ledger 225 encrypts the network block such that only the second owner 305 is able to view the network identifying metadata 235. The ledger 225 may provide authorization to the second owner 225 to modify the network block, as described below. In some embodiments, the ledger 225 creates a link between the first owner 205 and the second owner 305 indicative of the transfer of user control of the one or more devices to the second owner 305.

Figure 4:
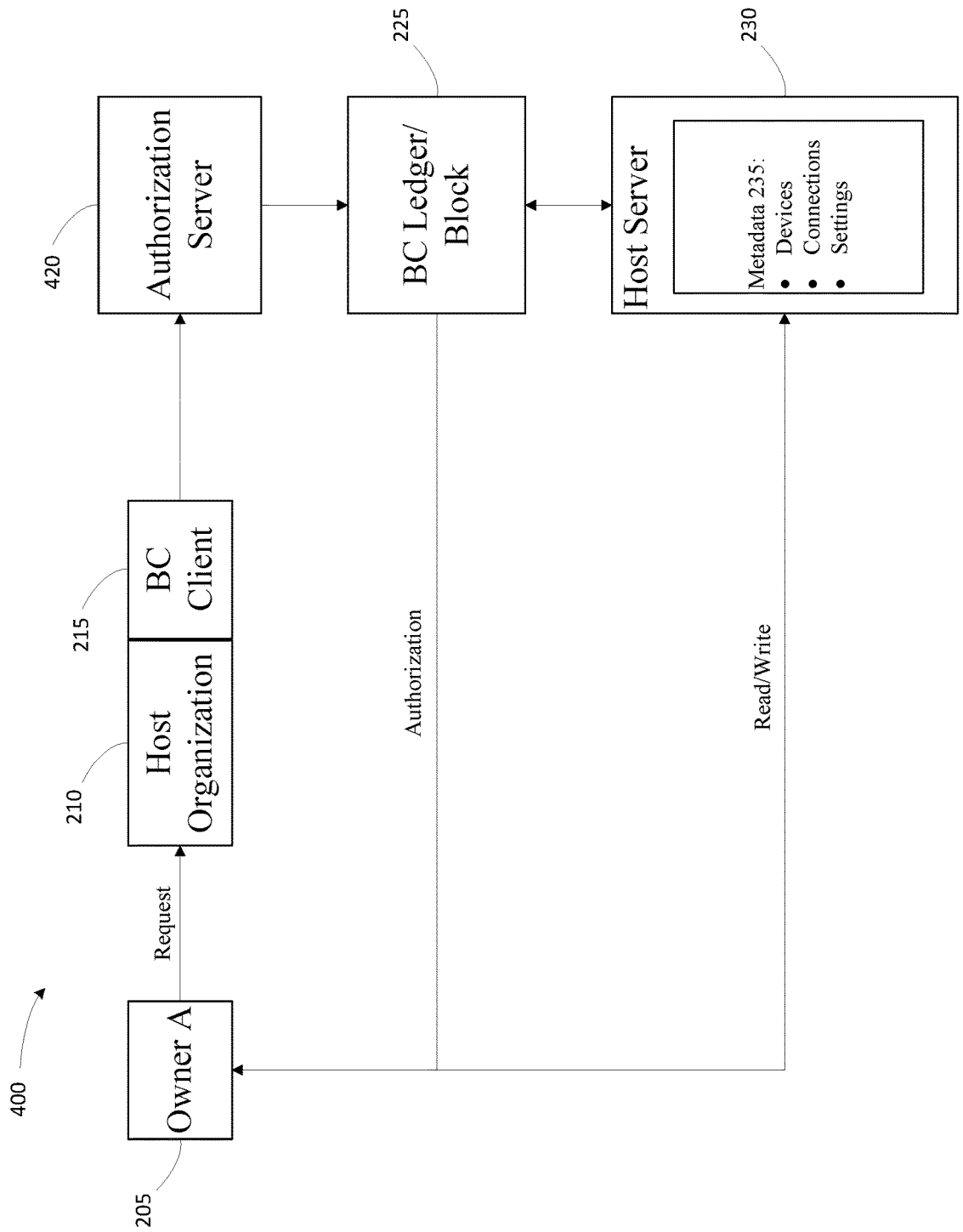
FIG. 4 illustrates a system for user control of the one or more devices of FIG. 1, in accordance with an embodiment of the disclosure.

FIG. 4 illustrates a network system 400 for user control of the one or more devices within the physical space 100, according to some embodiments. In the illustrated embodiment, the network system 400 may include similar components to the components of the network system 200, as described above with reference to FIG. 2. In some embodiments, the network system 400 includes an authorization server 420. The authorization server 420 may be a private blockchain. For example, the authorization server 420 is a server run by a third-party agency, company, or organization to validate the creation of the network block, as described above. When validating the network block, the authorization server 420 stores a copy of the network block for future validations. For example, the authorization server 420 stores the network block, including the network identifying metadata 235 in a private, distributed digital ledger. The authorization server 420 may provide greater security of the network block by setting permission levels or identification authorization such that only the first owner 205 can modify the network block.

In some embodiments, the authorization server 420 is in electronic communication with a centralized, digital storage of a plurality of network blocks. In the illustrated embodiment, the authorization server 420 is in electronic communication with the ledger 225. For example, the authorization server 420 posts their stored transactions (e.g., creation of network blocks) to the ledger 225 for storage. In some embodiments, once the network block is stored in the ledger 225, the ledger 225 encrypts the network block such that only the first owner 205 is able to view the network identifying metadata 235. The ledger 225 may provide authorization to the first owner 225 to modify the network block, as described below. Additionally, the ledger 225 securely verifies the creation of the network block within the network system 200.

Figure 5:
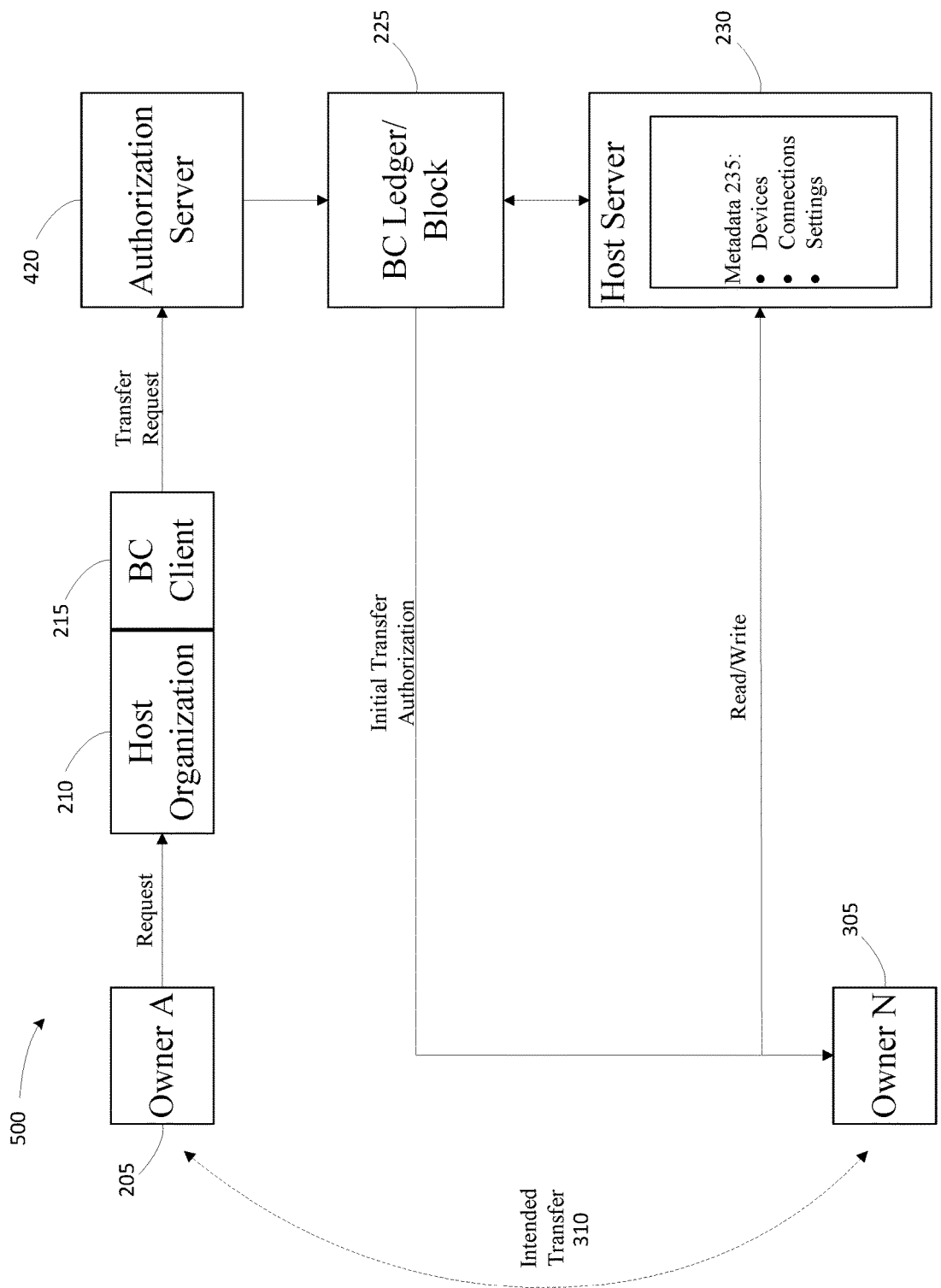
FIG. 5 illustrates a system for tracking user control of the one or more devices of FIG. 1, in accordance with an embodiment of the disclosure.

FIG. 5 illustrates a network system 500 for tracking user control of the one or more devices within the physical space 100, according to some embodiments. In the illustrated embodiment, the network system 500 may include similar components to the components of the network system 400, as described above with reference to FIG. 4. In some embodiments, the network system 400 includes the second owner 305. In some embodiments, the first owner 205 provides the transfer request to the client 215 indicative of an intended transfer 310 of user control of the one or more devices to the second owner 305. In some embodiments, the transfer request is provided via the web application or the mobile application. In other embodiments, the transfer request may be, or may be a result of, an electronic transfer of assets such as, but not limited to, a bank transfer, a bank transaction, a loan transfer, or the like for the physical space 100. In some embodiments, for example when the physical space 100 transfers user control frequently (such as an apartment, a condo, a hospital room, etc.), the transfer request may be provided to the second owner 305 via electronic mail from the web application or the mobile application. Upon receipt of the transfer request, the client 215 may process the transfer request as a transaction of user control of the network block from the first owner 205 to the second owner 210. The client 215 may provide the transaction of user control to the authorization server 420. The authorization server 420 may validate the transaction of the network block and store a copy of the network block with the second owner 305 having user control of the one or more devices. In some embodiments, the authorization server 420 posts their stored transactions (e.g., the intended transfer 310 of the network block) to the ledger 225 for storage. In some embodiments, once the network block is stored in the ledger 225, the ledger 225 encrypts the network block such that only the second owner 305 is able to view the network identifying metadata 235. The ledger 225 may provide authorization to the second owner 225 to modify the network block, as described below. In some embodiments, the authorization server 420 provides authorization to the second owner 225. In some embodiments, the ledger 225 creates a link between the first owner 205 and the second owner 305 indicative of the transfer of user control of the one or more devices to the second owner 305.

Figure 6:
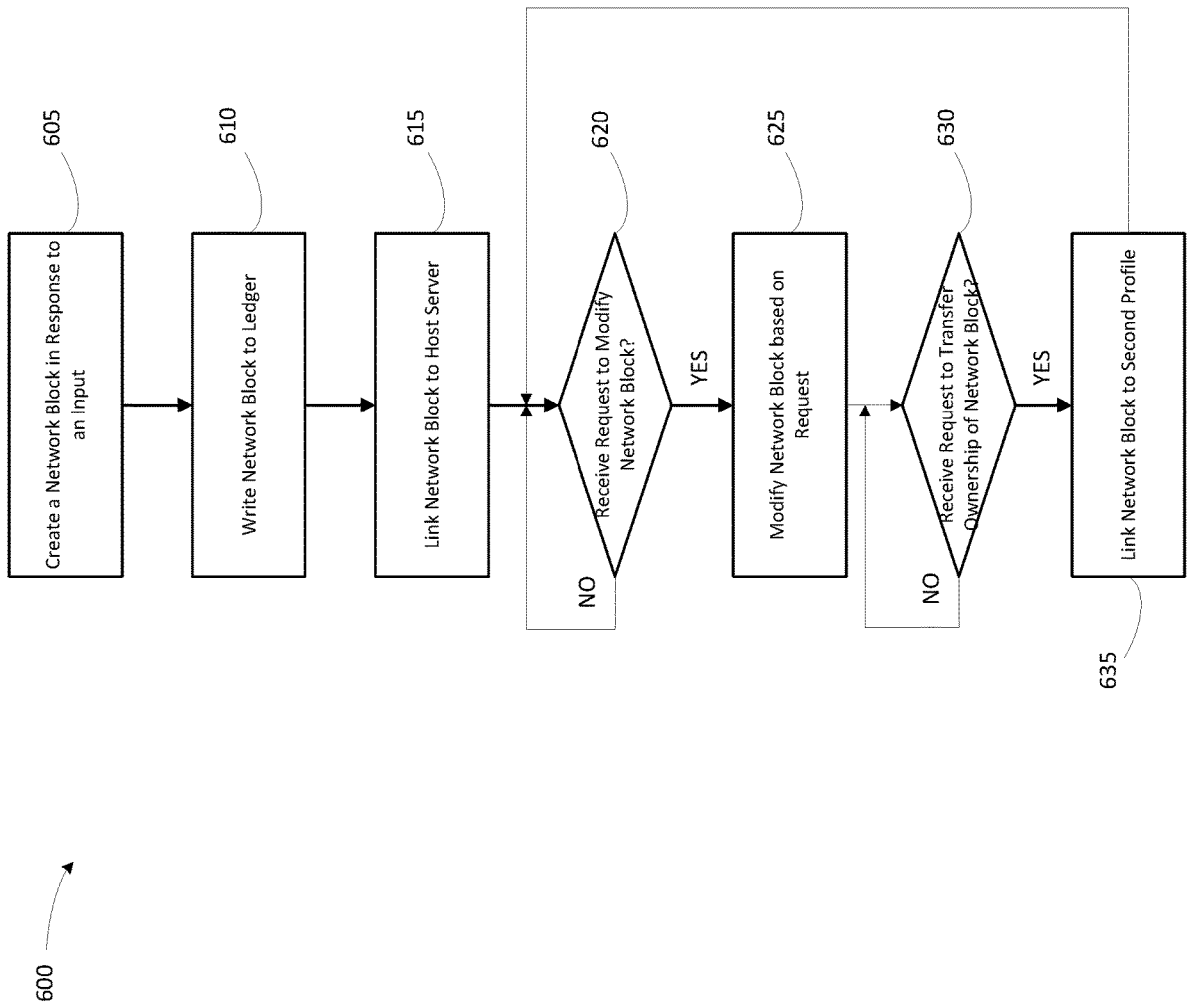
FIG. 6 is a flow chart of a method for user control of one or more devices located within a physical space, in accordance with an embodiment of the disclosure.

FIG. 6 is a flow chart illustrating a method 600 for user control of one or more devices located within the physical space 100, according to some embodiments. It should be understood that the order of the steps disclosed in the method 600 could vary. For example, additional steps may be added to the process and not all of the steps may be required, or steps shown in one order may occur in a second order. The method 600 begins at step 605 when the client 215 creates the network block in response to the user input indicative of creating the network block from the first owner 205. In some embodiments, the network block includes the network identifying metadata 235. The network identifying metadata 235 may include the list of the one or more devices located within the physical space 100. For example, the list of the one or more devices includes the first set of devices 105, the second set of devices 110, and the third set of devices 115. In some embodiments, the first set of devices 105 includes first identifying metadata, the second set of devices 110 includes second identifying metadata, and the third set of devices 115 includes third identifying metadata. The first identifying metadata being different than the second identifying metadata and the third identifying metadata and the second identifying metadata being different than the third identifying metadata. It should be understood that the list of the one or more devices may include a greater or fewer number of devices than the number described above. The method 600 then proceeds to step 610.

At step 610, the client 215 writes the network block to the ledger 225 under a first user profile. For example, the client 215 provides the network block to the ledger 225 via the plurality of distributed nodes 220 or the authorization server 420. The ledger 225 may store the network block under the first user profile associated with the first owner 205. In some embodiments, the network block is stored in a blockchain of the ledger 225. The method 600 then proceeds to step 615. At step 615, the ledger 225 links the network block to the host server 230. For example, the ledger 225 provides the network block to the host server 230 and the host server 230 stores an encrypted copy of the network block for access by the first owner 205 via the client 215. The method 600 then proceeds to step 620.

At step 620, the host server 230 determines whether a first request is received at the host server 230 to modify the network block. For example, the first owner 205 provides the first request to modify the network block to the host server 230 via the client 215. When the host server 230 determines that the first request is not received, the method 600 may repeat step 620 until the host server 230 receives the first request. When the host server 230 determines that the first request is received, the method 600 then proceeds to step 625. At step 625, the host server 230 modifies the network block in response to receiving the first request. For example, the host server 230 adds the fourth set of devices 120 including fourth identifying metadata to the network block in response to receiving the first request. In other embodiments, the host server 230 deletes one or more devices within the physical space 100 from the network block. For example, the host server 230 deletes the third set of devices 115 including the third identifying metadata from the network block in response to receiving the first request. In other embodiments, the host server 230 alters the network identifying metadata 235 within the network block in response to receiving the first request. Once the network block is modified by the host server 230 provides the modified network block to the ledger 225. The ledger 225 may store a copy of the modified network block. The method 600 then proceeds to step 630.

At step 630, the host server 230 determines whether a second request is received at the host server 230 to transfer ownership of the network block. For example, the first owner 205 provides the second request to transfer ownership of the network block to the second owner 305 via the client 215. When the host server 230 determines that the second request is not received, the method 600 may repeat step 630 until the host server 230 receives the second request. When the host server 230 determines that the second request is received, the method 600 then proceeds to step 635. At step 635, the ledger 225 links the network block to a second user profile in response to receiving the second request. The second user profile may be associated with the second owner 305. For example, the ledger 225 receives the second request indicative of the intended transfer 310 of user control of the network block including the list of the one or more devices to the second owner 305 and links the network block to the second owner 305. In some examples, linking the network block to the second user profile transfers ownership of the list of the one or more devices located within the physical space 100 to the second user profile (e.g., to the second owner 305). For example, ownership of the first set of devices 105 including the first identifying metadata, the second set of devices 110 including the second set of identifying metadata, and the third set of devices 115 including the third identifying metadata is transferred to the second user profile. In some embodiments, after the ledger 225 links the network block to the second user profile, the method 600 may return to step 620 to continue to determine whether a request to modify the network block is received.

In some embodiments, the host organization 210 and the client 215 receive a third request to create the first user profile from the first owner 205 via the web application and/or the mobile application. For example, the first user profile is a unique exchange profile such that any actions performed by the web application and/or the mobile application are associated with the first owner 205 performing the actions. Based on receiving the third request, the web application and/or mobile application creates the first user profile. The first user profile may include a public and private key pair for the host organization 210 to encrypt all transactions made via the client 215 and for viewing of the network block on the host server 230. Accordingly, only those with the needed key may view the transaction and the contents of the network block. Similarly, the host organization 210 and the client 215 may receive a fourth request to create the second user profile from the second owner 305 via the web application and/or the mobile application. For example, the second user profile is a unique exchange profile such that any actions performed by the web application and/or the mobile application are associated with the second owner 305 performing the actions. Based on receiving the fourth request, the web application and/or mobile application creates the second user profile. The second user profile may include a public and private key pair for the host organization 210 to encrypt all transactions made via the client 215 and for viewing of the network block on the host server 230.

Figure 7:
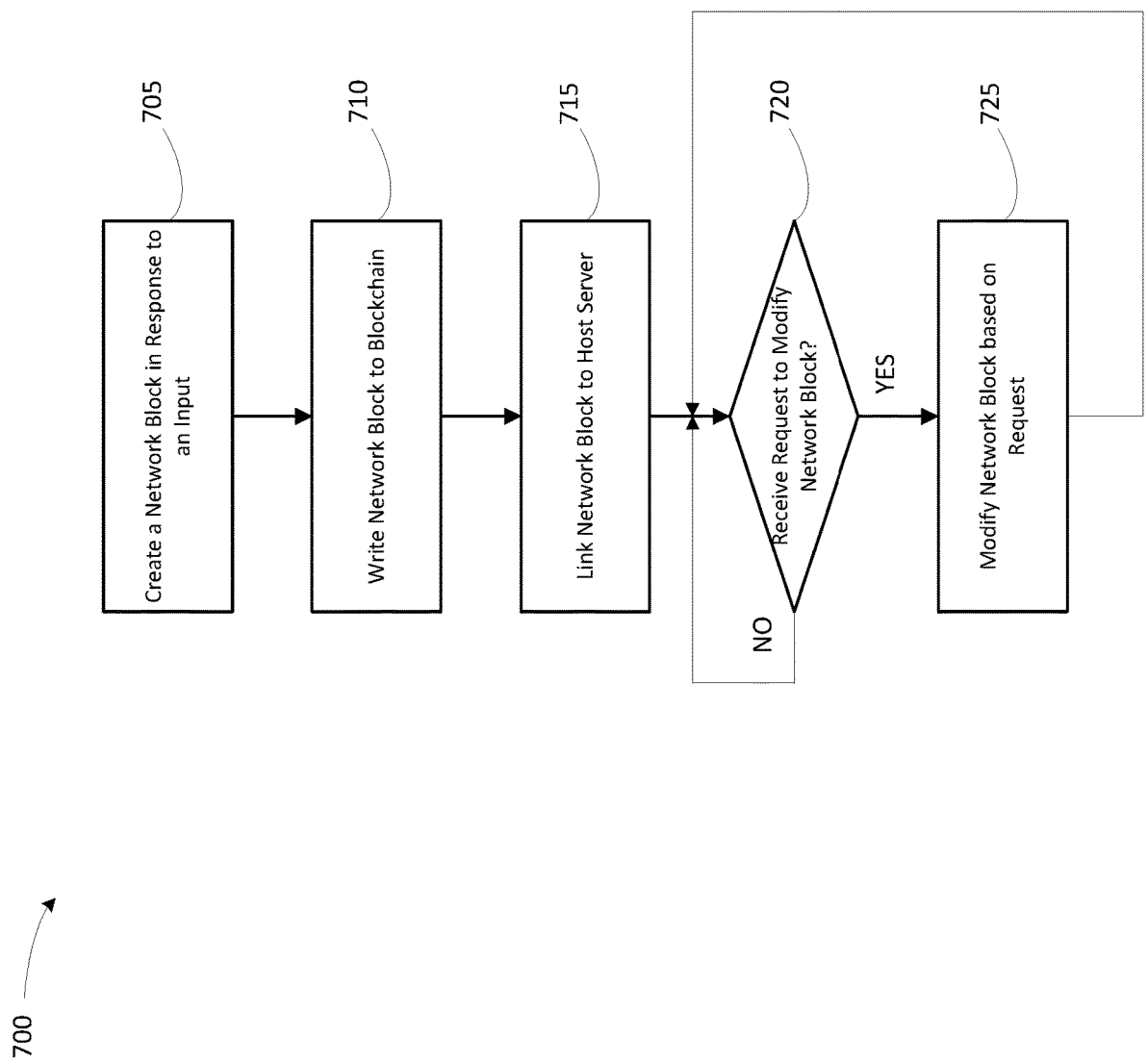
FIG. 7 is a flow chart of a method for modifying user control of one or more devices located within a physical space, in accordance with an embodiment of the disclosure.

FIG. 7 is a flow chart of a method 700 for modifying user control of one or more devices located within a physical space 100, according to some embodiments. It should be understood that the order of the steps disclosed in the method 700 could vary. For example, additional steps may be added to the process and not all of the steps may be required, or steps shown in one order may occur in a second order. The method 700 begins at step 705 when the client 215 creates the network block in response to the user input indicative of creating the network block from the first owner 205. In some embodiments, the network block includes the network identifying metadata 235. The network identifying metadata 235 may include the list of the one or more devices located within the physical space 100. For example, the list of the one or more devices includes the first set of devices 105, the second set of devices 110, and the third set of devices 115. In some embodiments, the first set of devices 105 includes first identifying metadata, the second set of devices 110 includes second identifying metadata, and the third set of devices 115 includes third identifying metadata. The first identifying metadata being different than the second identifying metadata and the third identifying metadata and the second identifying metadata being different than the third identifying metadata. It should be understood that the list of the one or more devices may include a greater or fewer number of devices than the number described above. The method 700 then proceeds to step 710.

At step 710, the client 215 writes the network block to the ledger 225 under the first user profile. For example, the client 215 provides the network block to the ledger 225 via the plurality of distributed nodes 220 or the authorization server 420. The ledger 225 may store the network block under the first user profile associated with the first owner 205. In some embodiments, the network block is stored in a blockchain of the ledger 225. The method 700 then proceeds to step 715. At step 715, the ledger 225 links the network block to the host server 230. For example, the ledger 225 provides the network block to the host server 230 and the host server 230 stores an encrypted copy of the network block for access by the first owner 205 via the client 215. The method 700 then proceeds to step 720.

At step 720, the host server 230 determines whether a first request is received at the host server 230 to modify the network block. For example, the first owner 205 provides the first request to modify the network block to the host server 230 via the client 215. When the host server 230 determines that the first request is not received, the method 700 may repeat step 720 until the host server 230 receives the first request. When the host server 230 determines that the first request is received, the method 700 then proceeds to step 725. At step 725, the host server 230 modifies the network block in response to receiving the first request. For example, the host server 230 adds the fourth set of devices 120 including fourth identifying metadata to the network block in response to receiving the first request. In some instances, the host server 230 adds network identifying metadata 235 to the list of the one or more devices based on receiving the first request. In other embodiments, the host server 230 deletes one or more devices within the physical space 100 from the network block. For example, the host server 230 deletes the third set of devices 115 including the third identifying metadata from the network block in response to receiving the first request. In some embodiments, the host server 230 deletes network identifying metadata 235 from the list of the one or more devices based on receiving the first request. In other embodiments, the host server 230 alters the network identifying metadata 235 within the network block in response to receiving the first request. Once the network block is modified by the host server 230 provides the modified network block to the ledger 225. The ledger 225 may store a copy of the modified network block. In some embodiments, after the host server 230 modifies the network block, the method 700 may return to step 720 to continue to determine whether a request to modify the network block is received.

Figure 8:
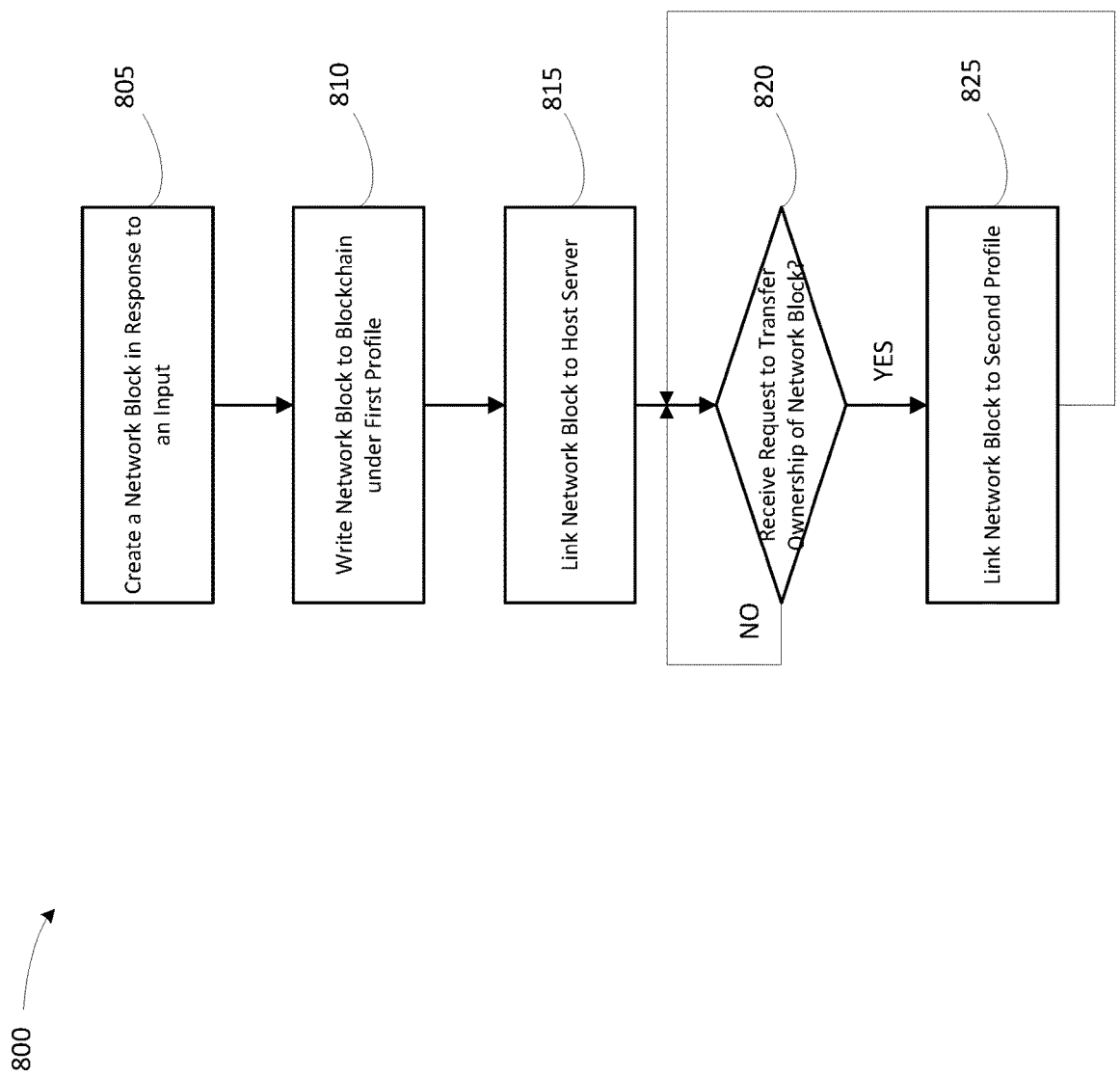
FIG. 8 is a flow chart of a method for tracking user control of one or more devices located within a physical space, in accordance with an embodiment of the disclosure.

FIG. 8 is a flow chart of a method 800 for tracking user control of one or more devices located within the physical space 100, according to some embodiments. It should be understood that the order of the steps disclosed in the method 800 could vary. For example, additional steps may be added to the process and not all of the steps may be required, or steps shown in one order may occur in a second order. The method 800 begins at step 805 when the client 215 creates the network block in response to the user input indicative of creating the network block from the first owner 205. In some embodiments, the network block includes the network identifying metadata 235. The network identifying metadata 235 may include the list of the one or more devices located within the physical space 100. For example, the list of the one or more devices includes the first set of devices 105, the second set of devices 110, and the third set of devices 115. In some embodiments, the first set of devices 105 includes first identifying metadata, the second set of devices 110 includes second identifying metadata, and the third set of devices 115 includes third identifying metadata. The first identifying metadata being different than the second identifying metadata and the third identifying metadata and the second identifying metadata being different than the third identifying metadata. It should be understood that the list of the one or more devices may include a greater or fewer number of devices than the number described above. The method 800 then proceeds to step 810.

At step 810, the client 215 writes the network block to the ledger 225 under the first user profile. For example, the client 215 provides the network block to the ledger 225 via the plurality of distributed nodes 220 or the authorization server 420. The ledger 225 may store the network block under the first user profile associated with the first owner 205. In some embodiments, the network block is stored in a blockchain of the ledger 225. The method 800 then proceeds to step 815. At step 815, the ledger 225 links the network block to the host server 230. For example, the ledger 225 provides the network block to the host server 230 and the host server 230 stores an encrypted copy of the network block for access by the first owner 205 via the client 215. The method 800 then proceeds to step 820.

At step 820, the host server 230 determines whether a first request is received at the host server 230 to transfer ownership of the network block. For example, the first owner 205 provides the first request to transfer ownership of the network block to the second owner 305 via the client 215. When the host server 230 determines that the second request is not received, the method 800 may repeat step 820 until the host server 230 receives the second request. When the host server 230 determines that the second request is received, the method 800 then proceeds to step 825. At step 825, the ledger 225 links the network block to a second user profile in response to receiving the first request. The second user profile may be associated with the second owner 305. For example, the ledger 225 receives the first request indicative of the intended transfer 310 of user control of the network block including the list of the one or more devices to the second owner 305 and links the network block to the second owner 305. In some examples, linking the network block to the second user profile transfers ownership of the list of the one or more devices located within the physical space 100 to the second user profile (e.g., to the second owner 305). For example, ownership of the first set of devices 105 including the first identifying metadata, the second set of devices 110 including the second set of identifying metadata, and the third set of devices 115 including the third identifying metadata is transferred to the second user profile. In some embodiments, after the ledger 225 links the network block to the second user profile, the method 800 may return to step 820 to continue to determine whether a request to transfer ownership of the network block is received.

In some embodiments, the host organization 210 and the client 215 receive a second request to create the first user profile from the first owner 205 via the web application and/or the mobile application, as described above. Based on receiving the second request, the web application and/or mobile application creates the first user profile. Similarly, the host organization 210 and the client 215 may receive a third request to create the second user profile from the second owner 305 via the web application and/or the mobile application, as described above. Based on receiving the third request, the web application and/or mobile application creates the second user profile.

Thus, the application provides, among other things, methods for user control of one or more devices located within a physical space. Various features and advantages of the application are set forth in the following claims.

What is claimed is:

1. A method for user control of one or more devices located within a physical space, the method comprising:
   creating a network block in response to a user input, the network block including network identifying metadata, wherein the network identifying metadata includes a list of the one or more devices located within the physical space;
   writing the network block to a ledger under a first user profile;
   linking the network block to a host server;
   receiving a first request to modify the network block;
   modifying the network block in response to receiving the first request,
      wherein modifying the network block includes at least one selected from a group consisting of adding network identifying metadata to the network block, deleting network identifying metadata from the network block, and altering the network identifying metadata within the network block;
   receiving a second request to transfer ownership of the network block; and
   linking the network block to a second user profile in response to receiving the second request,
      wherein linking the network block to the second user profile transfers ownership of the list of the one or more devices located within the physical space to the second user profile.

2. The method of claim 1, wherein the list of the one or more devices includes at least one selected from the group consisting of a first set of devices, a second set of devices, and a third set of devices, the first set of devices being different than the second set of devices and the third set of devices, and the second set of devices being different than the third set of devices.

3. The method of claim 2, wherein the first set of devices includes first identifying metadata, the second set of devices includes second identifying metadata, and the third set of devices includes third identifying metadata.

4. The method of claim 3, wherein linking the network block to the second user profile transfers ownership of the first set of devices, the second set of devices, and the third set of devices to the second user profile.

5. The method of claim 1, wherein writing the network block to the ledger includes storing the network block in a blockchain.

6. The method of claim 1, wherein the list of the one or more devices includes smart home devices.

7. The method of claim 1, further comprising:
   receiving a third request to create the first user profile;
   creating the first user profile based on the third request;
   receiving a fourth request to create the second user profile; and
   creating the second user profile based on the fourth request,
      wherein the third request is created by a different user than the fourth request.

8. A method for modifying user control of one or more devices located within a physical space, the method comprising:
   creating a network block in response to a user input, the network block including network identifying metadata, wherein the network identifying metadata includes a list of the one or more devices located within the physical space;
   writing the network block to a ledger under a first user profile;
   linking the network block to a host server;
   receiving a request to modify the network block; and
   modifying the network block in response to receiving the request to modify the network block.

9. The method of claim 8, wherein the list of the one or more devices includes at least one selected from the group consisting of a first set of devices, a second set of devices, and a third set of devices, the first set of devices being different than the second set of devices and the third set of devices, and the second set of devices being different than the third set of devices.

10. The method of claim 9, wherein the first set of devices includes first identifying metadata, the second set of devices includes second identifying metadata, and the third set of devices includes third identifying metadata.

11. The method of claim 10, wherein modifying the network block further includes:
    adding network identifying metadata to the network block based on receiving the request to modify the network block.

12. The method of claim 10, wherein modifying the network block further includes:
    deleting network identifying metadata from the network block based on receiving the request to modify the network block.

13. The method of claim 10, wherein modifying the network block further includes:
    altering the network identifying metadata within the network block based on receiving the request to modify the network block.

14. A method for tracking user control of one or more devices located within a physical space, the method comprising:
    creating a network block in response to a user input, the network block including network identifying metadata, wherein the network identifying metadata includes a list of the one or more devices located within the physical space;
    writing the network block to a ledger under a first user profile;
    linking the network block to a host server;
    receiving a first request to transfer ownership of the network block; and
    linking the network block to a second user profile in response to receiving the first request to transfer ownership.

15. The method of claim 14, wherein the list of the one or more devices includes at least one selected from the group consisting of a first set of devices, a second set of devices, and a third set of devices, the first set of devices being different than the second set of devices and the third set of devices, and the second set of devices being different than the third set of devices.

16. The method of claim 15, wherein the first set of devices includes first identifying metadata, the second set of devices includes second identifying metadata, and the third set of devices includes third identifying metadata.

17. The method of claim 16, wherein linking the network block to the second user profile transfers ownership of the first set of devices, the second set of devices, and the third set of devices to the second user profile.

18. The method of claim 14, further comprising:
    storing the network block in a blockchain.

19. The method of claim 14, wherein the list of the one or more devices includes the devices of the physical space.

20. The method of claim 14, further comprising:
receiving a second request to create the first user profile;
creating the first user profile based on the second request;
receiving a third request to create the second user profile; and
creating the second user profile based on the third request,
  wherein the second request is created by a different user than the third request.

\* \* \* \* \*